(12) United States Patent
Mohanty et al.

(10) Patent No.: US 12,361,159 B2
(45) Date of Patent: Jul. 15, 2025

(54) GENERATING AND PROCESSING PERSONAL INFORMATION CHAINS USING MACHINE LEARNING TECHNIQUES

(71) Applicant: Dell Products L.P., Round Rock, TX (US)

(72) Inventors: Bijan Kumar Mohanty, Austin, TX (US); David J. Linsey, Marietta, GA (US); Hung T. Dinh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 275 days.

(21) Appl. No.: 17/726,657

(22) Filed: Apr. 22, 2022

(65) Prior Publication Data

US 2023/0342488 A1 Oct. 26, 2023

(51) Int. Cl.
*G06F 21/62* (2013.01)
*G06F 21/60* (2013.01)

(52) U.S. Cl.
CPC ........ *G06F 21/6245* (2013.01); *G06F 21/602* (2013.01)

(58) Field of Classification Search
None
See application file for complete search history.

(56) References Cited

U.S. PATENT DOCUMENTS

| 8,234,127 | B2 | 7/2012 | Naik et al. | |
|---|---|---|---|---|
| 10,505,726 | B1 | 12/2019 | Andon | |
| 10,541,807 | B1* | 1/2020 | Morimura | G06F 21/6245 |
| 11,620,558 | B1* | 4/2023 | Xu | G06N 7/01 |
| | | | | 706/12 |
| 2001/0051928 | A1* | 12/2001 | Brody | G06F 21/16 |
| | | | | 705/52 |

(Continued)

OTHER PUBLICATIONS

"Anomaly Detection with Isolation Forest and Kernel Density Estimation" posted at <https://machinelearningmastery.com/anomaly-detection-with-isolation-forest-and-kernel-density-estimation/> on Jan. 1, 2022 (Year: 2022).*

(Continued)

*Primary Examiner* — Scott B Christensen
(74) *Attorney, Agent, or Firm* — Ryan, Mason & Lewis, LLP

(57) ABSTRACT

Methods, apparatus, and processor-readable storage media for generating and processing personal information chains using machine learning techniques are provided herein. An example computer-implemented method includes processing data, from one or more data sources, pertaining to one or more events involving an individual; generating a personal information chain associated with the individual by processing at least a portion of the processed data using at least one cryptographic function and linking that at least a portion of the processed data in accordance with at least one temporal parameter; performing anomaly detection by processing at least a portion of the personal information chain associated with the individual using one or more machine learning techniques; and performing one or more automated actions based at least in part on one or more of the personal information chain and results from the anomaly detection.

20 Claims, 9 Drawing Sheets

(56) References Cited

U.S. PATENT DOCUMENTS

| | | | |
|---|---|---|---|
| 2011/0208689 A1* | 8/2011 | Chakraborty | G06N 5/022 |
| | | | 707/777 |
| 2013/0339160 A1 | 12/2013 | Avery | |
| 2014/0108332 A1 | 4/2014 | Haze | |
| 2014/0365522 A1* | 12/2014 | Soundararajan | G06F 16/28 |
| | | | 707/770 |
| 2018/0129955 A1* | 5/2018 | Saxena | G06N 20/00 |
| 2018/0211115 A1 | 7/2018 | Klein | |
| 2018/0227128 A1* | 8/2018 | Church | H04L 9/3247 |
| 2019/0058719 A1 | 2/2019 | Kar | |
| 2019/0103036 A1 | 4/2019 | Anderson | |
| 2019/0147137 A1* | 5/2019 | Gergely | H04L 9/3226 |
| | | | 705/51 |
| 2019/0294721 A1 | 9/2019 | Keifer | |
| 2019/0342336 A1* | 11/2019 | Finkelstein | G06F 21/6245 |
| 2019/0361466 A1 | 11/2019 | Obropta, Jr. | |
| 2020/0097559 A1* | 3/2020 | Wittern | G06F 16/24537 |
| 2020/0110148 A1* | 4/2020 | Estripeau | G01S 5/0027 |
| 2020/0213329 A1* | 7/2020 | Simons | H04L 9/3297 |
| 2020/0342381 A1 | 10/2020 | Panikkar | |
| 2021/0098096 A1* | 4/2021 | Gergely | H04L 63/083 |
| 2021/0118547 A1* | 4/2021 | Morris | G16H 50/70 |
| 2021/0406760 A1* | 12/2021 | Duesterwald | G06N 5/013 |
| 2022/0374888 A1 | 11/2022 | Lackey | |

OTHER PUBLICATIONS

"A complete guide to permissions in a GraphQL API" posted at <https://blog.logrocket.com/a-complete-guide-to-permissions-in-a-graphql-api/> on Oct. 7, 2020 (Year: 2020).*

"Use cases for graph databases" posted at <https://6point6.co.uk/insights/use-cases-for-graph-databases/> on Mar. 7, 2019 (Year: 2019).*

<https://crypto.stackexchange.com/questions/51243/what-is-the-difference-between-a-digest-and-a-hash-function> posted Sep. 2017 (Year: 2017).*

Zucconi, A., An Introductions to Neural Networks and Autoencoders, https://www.alanzucconi.com/2018/03/14/an-introduction-to-autoencoders/, Mar. 14, 2018.

* cited by examiner

FIG. 4

```python
import hashlib
import datetime class PersonalLifeEvent():
    def __init__(self, index, timestamp, role, data, previous_hash):
        self.index = index
        self.timestamp = timestamp
        self.role = role
        self.data = data
        self.previous_hash = previous_hash
        self.hash = self.hashing()

# Hash with SHA256 encryption
    def hashing(self):
        key = hashlib.sha256()
        key.update(str(self.index).encode('utf-8'))
        key.update(str(self.timestamp).encode('utf-8'))
        key.update(str(self.role).encode('utf-8'))
        key.update(str(self.data).encode('utf-8'))
        key.update(str(self.previous_hash).encode('utf-8'))
        return key.hexdigest()
```

FIG. 5

```python
class PersonalInformationList():
    def __init__(self): # initialize when creating a List
        self.recordList = [self.get_genesis_record()]

def get_genesis_record(self):
        return PersonalLifeEvent (0,
                    datetime.datetime.utcnow(),
                    'Ordered', 'Genesis', 'arbitrary')
```

FIG. 6

```python
def add_record(self, role, data):
    self.recordList.append(PersonalLifeEvent (len(self.recordList),
                    datetime.datetime.utcnow(),
                    role,
                    data,
                    self.recordList[len(self.recordList)-1].hash))
```

FIG. 7

```python
def get_previous_record(self):
            return self.recordList[-1]
```

FIG. 8

```python
def verify(self, verbose=True):
    flag = True
    for i in range(1,len(self.recordList)):
        if self.recordList[i].index != i:
            flag = False
            if verbose:
                print(f'Wrong index at record {i}.')
        if self.recordList[i-1].hash != self.recordList[i].previous_hash:
            flag = False
            if verbose:
                print(f'Wrong previous hash at record {i}.')
        if self.recordList[i].hash != self.recordList[i].hashing():
            flag = False
            if verbose:
                print(f'Wrong hash at record {i}.')
        if self.recordList[i-1].timestamp >= self.recordList[i].timestamp:
            flag = False
            if verbose:
                print(f'Backdating at record {i}.')
            return flag
```

```
import numpy as np
import pandas as pd
import warnings
warnings.filterwarnings('ignore')
%matplotlib inline
import random
import matplotlib.pyplot as plt
import seaborn as sns
from sklearn.ensemble import IsolationForest personal_data = pd.read_csv('personal_infor_data.csv')
personal_data.head(10)

random_state = np.random.RandomState(42)
model=IsolationForest(n_estimators=100,max_samples='auto',contamination=float(0.2),random_state=random_state)

model.fit(personal_data[['role']])

personal_data['scores'] = model.decision_function(personal_data[['role']])

personal_data['anomaly_score'] = model.predict(personal_data[['latency']])

personal_data[personal_data['anomaly_score']==-1].head(10)
```

GENERATING AND PROCESSING PERSONAL INFORMATION CHAINS USING MACHINE LEARNING TECHNIQUES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to techniques for data management using such systems.

BACKGROUND

Individuals commonly generate large amounts of data including, for example, medical data, educational data, employment-related data, etc. The data are typically generated and managed by various entities across multiple distributed systems, and not under the control of the individuals in question. Such conventional data management approaches are therefore fragmented and create issues related, for example, to data security, data accuracy, and data visibility.

SUMMARY

Illustrative embodiments of the disclosure provide techniques for generating and processing personal information chains using machine learning techniques. An exemplary computer-implemented method includes processing data, from one or more data sources, pertaining to one or more events involving an individual, and generating a personal information chain associated with the individual by processing at least a portion of the processed data using at least one cryptographic function and linking that at least a portion of the processed data in accordance with at least one temporal parameter. The method also includes performing anomaly detection by processing at least a portion of the personal information chain associated with the individual using one or more machine learning techniques, and performing one or more automated actions based at least in part on one or more of the personal information chain and results from the anomaly detection.

Illustrative embodiments can provide significant advantages relative to conventional data management approaches. For example, problems associated with data security, data accuracy, and data visibility are overcome in one or more embodiments through automatically producing and processing personal information chains using one or more machine learning techniques These and other illustrative embodiments described herein include, without limitation, methods, apparatus, systems, and computer program products comprising processor-readable storage media.

BRIEF DESCRIPTION OF THE DRAWINGS

FIG. 4 shows an example code snippet for hashing life event records in an illustrative embodiment.

FIG. 5 shows an example code snippet for creating a genesis record in an illustrative embodiment.

FIG. 6 shows an example code snippet for creating a new life event record in an illustrative embodiment.

FIG. 7 shows an example code snippet for retrieving a previous record in an illustrative embodiment.

FIG. 8 shows an example code snippet for performing information verification in an illustrative embodiment.

FIG. 9 shows an example code snippet for determining an anomaly score in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
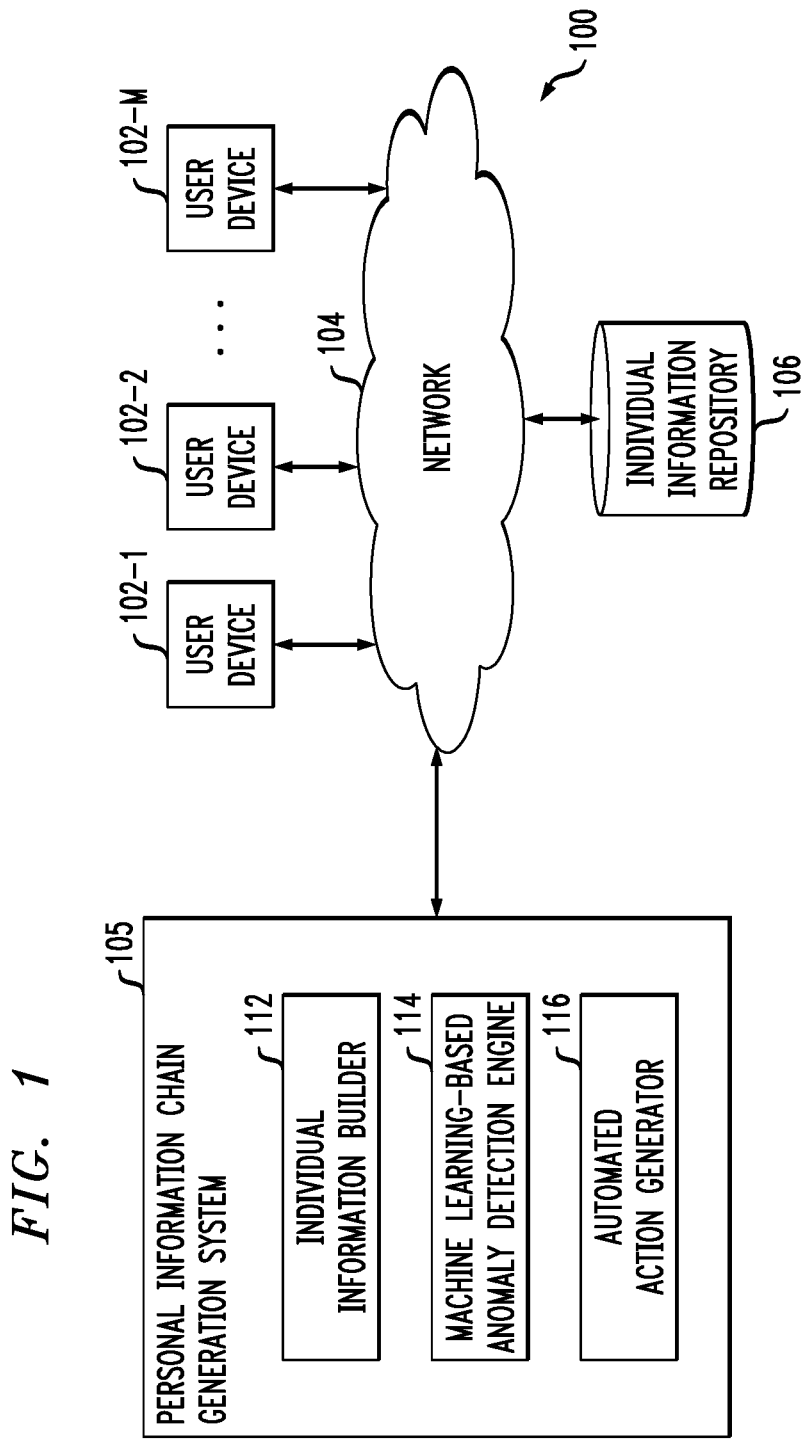
FIG. 1 shows an information processing system configured for generating and processing personal information chains using machine learning techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is personal information chain generation system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, personal information chain generation system 105 can have an associated individual information repository 106 configured to store data pertaining to events associated with the life of one or more individuals, which comprise, for example, health-related data, education-related data, employment-related data, etc. In one or more embodiments, even though life event records and/or entities are commonly federated and generated by a multitude of stakeholders, a central database (e.g., individual information repository 106) is utilized to provide a central point for managing and searching data for a given individual. Such an embodiment includes facilitating accessing relevant data and rendering the data accessible to an active party that is authenticated and authorized to the given data.

The individual information repository 106 in the present embodiment is implemented using one or more storage systems associated with personal information chain generation system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with personal information chain generation system 105 are one or more input-output devices, which illustratively comprise keyboards, displays or other types of input-output devices in any combination. Such input-output devices can be used, for example, to support one or more user interfaces to personal information chain generation system 105, as well as to support communication between personal information chain generation system 105 and other related systems and devices not explicitly shown.

Additionally, personal information chain generation system 105 in the FIG. 1 embodiment is assumed to be implemented using at least one processing device. Each such processing device generally comprises at least one processor and an associated memory, and implements one or more functional modules for controlling certain features of personal information chain generation system 105.

More particularly, personal information chain generation system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows personal information chain generation system 105 to communicate over the network 104 with the user devices 102, and illustratively comprises one or more conventional transceivers.

The personal information chain generation system 105 further comprises individual information builder 112, machine learning-based anomaly detection engine 114, and automated action generator 116.

It is to be appreciated that this particular arrangement of elements 112, 114 and 116 illustrated in personal information chain generation system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for generating and processing personal information chains using machine learning techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, personal information chain generation system 105 and individual information repository 106 can be on and/or part of the same processing platform.

An exemplary process utilizing elements 112, 114 and 116 of an example personal information chain generation system 105 in computer network 100 will be described in more detail with reference to the flow diagram of FIG. 11.

Accordingly, at least one embodiment includes a personal data composition framework for facilitating intelligent searching, sharing, authenticity verification and fraud detection. Such an embodiment includes generating and/or building, for a given user, a personal data and/or information framework that composes and links various data generated and managed by one or more entities. In such an embodiment, as further detailed herein, generating the framework includes providing one or more enforcements of security and privacy, as well as providing timestamp information and application programming interface-based (API-based) searching and sharing of data by leveraging at least one federated smart contract-enabled graph database. Additionally or alternatively, one or more embodiments includes using machine learning techniques to predict anomalies in the personal data management, for example, for use in connection with fraud detection and prevention.

Also, at least one embodiment includes linking, via the generated framework, data and/or information about various life events of the given individual as federated data elements, and storing such linked data in a graph database for improved accessibility and smart search capabilities. As noted above and further described herein, at least one embodiment also includes leveraging timestamping of each event record to establish precedency and legitimacy, as well as implementing certified authority-signed (CA-signed) records, multi-party authentication (wherein both the institution and/or entity and the given individual allow the data-related action), and one or more hashing techniques to link data to ensure authenticity and integrity of the life chain of information associated with the given individual. One or more embodiments, to assist in preserving such authenticity and integrity of transactions, include detecting anomalies using one or more machine learning techniques (e.g., supervised learning techniques such as autoencoders (using artificial neural networks), support vector machines (SVMs), etc., semi-supervised learning techniques (e.g., one class SVM, etc.), and unsupervised learning techniques (e.g., isolation forest models, k-means algorithms, k-nearest networks (KNN), etc.). This capability enables the framework to build a secure, federated set of touch-point data, while also allowing access as well as predictive capabilities for fraud detection and prevention.

Accordingly, as an individual goes through various events and/or stages in his or her life, secured vignettes of transactions related thereto are created with metadata and/or details pertaining, for example, to the identity of the stakeholder entity, the type of transactional event, etc. In at least one embodiment, such data elements or information vignettes are created after approval from the individual (e.g., the event data owner) and ensured by using a CA. By way of example, in one or more embodiments a CA vouches for the individual or organization involved in a transaction for enhanced security. For instance, when a stakeholder adds an element to the personal information chain (e.g., a university adding a credential, a hospital adding health data, etc.), securing and validating that transaction with their certificate from a CA increases the trust in that transaction. Such data can also be secured and rendered access-limited (e.g., ensuring authenticated access to the data), and in one or more embodiments, a hashed digest of the data is stored to limit and/or preclude tampering. Additionally, such an embodiment includes linking at least a portion of (e.g., all of) the data elements to form a personal information life event chain of the given individual.

Figure 2:
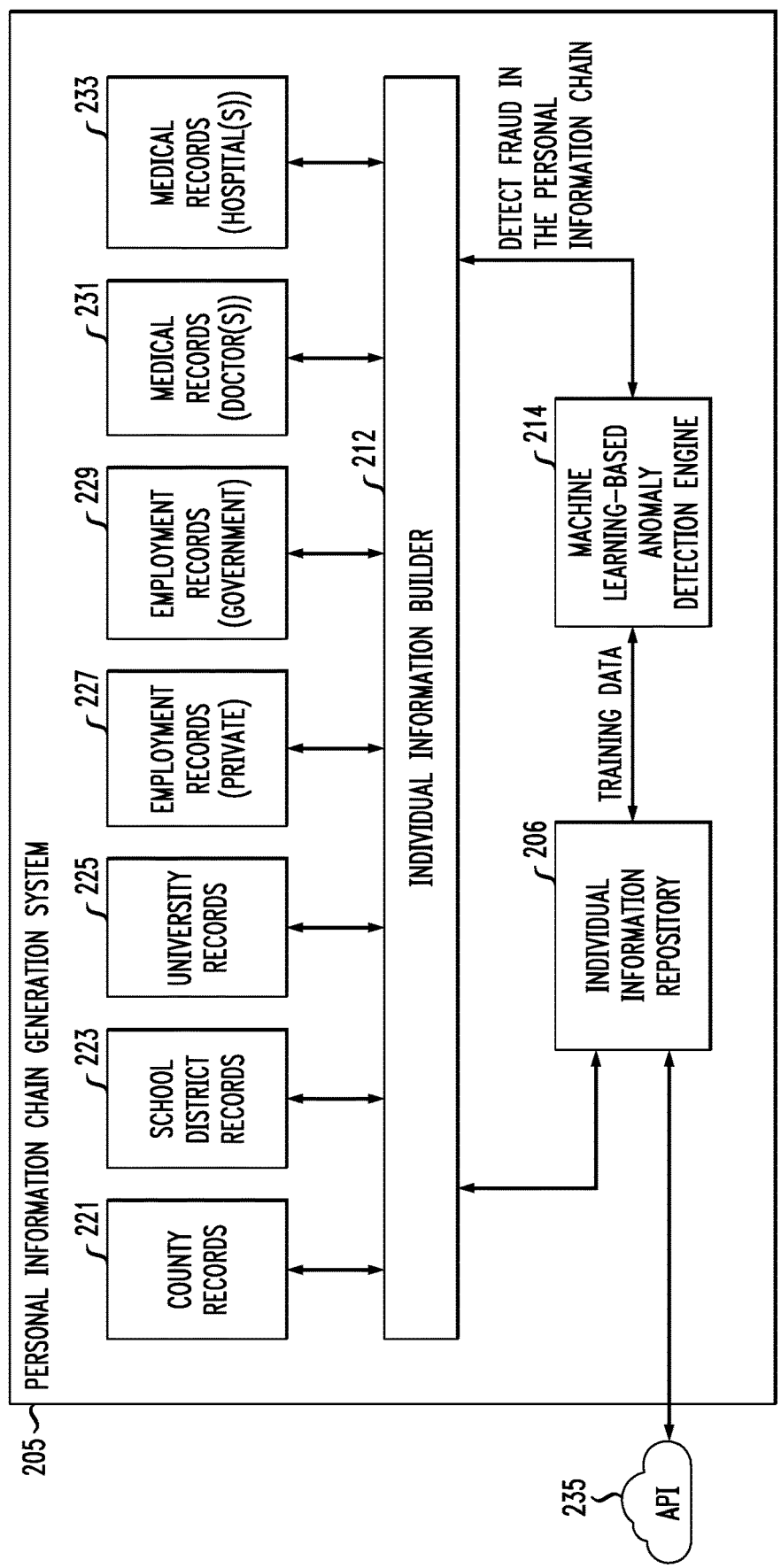
FIG. 2 shows example component architecture in an illustrative embodiment.

FIG. 2 shows example component architecture in an illustrative embodiment. By way of illustration, FIG. 2 depicts personal information chain generation system 205, which includes various records pertaining to a given individual including county records 221 (e.g., birth records, etc.), school district records 223, university records 225, employment records (from private industry and/or employer sources) 227, employment records (from government sources) 229, medical records (from one or more doctor-specific sources) 231, and medical records (from one or more hospital-specific sources) 233. In one or more embodiments, the data stakeholders of an individual (e.g., a university, a hospital, etc.) can add the data to the personal information list at the time of touch.

As further detailed herein, personal information chain generation system 205 stores and manages at least a portion of such records using individual information repository 206, which can include at least one graph database. In at least one embodiment, such a graph database can utilize at least one API query language (e.g., GraphQL) to enable secure API-based access (e.g., via API 235) to the life event data across the lifecycle of the given individual. Additionally, one or more embodiments include, via machine learning-based anomaly detection engine 214, leveraging one or more auto-encoders and at least one specialized neural network engine to detect personal information fraud across the lifecycle of any individual.

Such capabilities can be achieved, as depicted in the example embodiment of FIG. 2, by implementing individual information builder 212, individual information repository 206, and machine learning-based anomaly detection engine 214.

Individual information builder 212 is responsible for building foundational data elements of the individual person at each of one or more touch-points of the person's life cycle. In one or more embodiments, individual information builder 212 creates time-stamped, identity-verified records with details on the touch-points in question (e.g., people and/or entities involved, activities involved, location information, etc.). For example, in an individual's lifecycle, various life events can occur including health-related events, education-related events, employment-related events, real estate-related events, etc. Each such life event can result in the creation of at least one separate record by individual information builder 212 with information provided by one or more the stakeholders. Also, in at least one embodiment, such independent records are differentiated from each other using unique digital fingerprints and/or hashes. For example, any time there will be a new record created for the individual, a hash of the record will be created which will be used for linking the records and creating the chain/list. The hash of the previous record is also stored as part of the current record to ensure anti-tampering. Also, the unique digital fingerprint is that hash of the record which can be created, e.g., using a SHA512 algorithm and parsing data of the record. In addition to providing data security, such digital fingerprints and/or hashes can be used to link records and/or entities to build an end-to-end personal information list and/or collection for the given individual.

Figure 3:
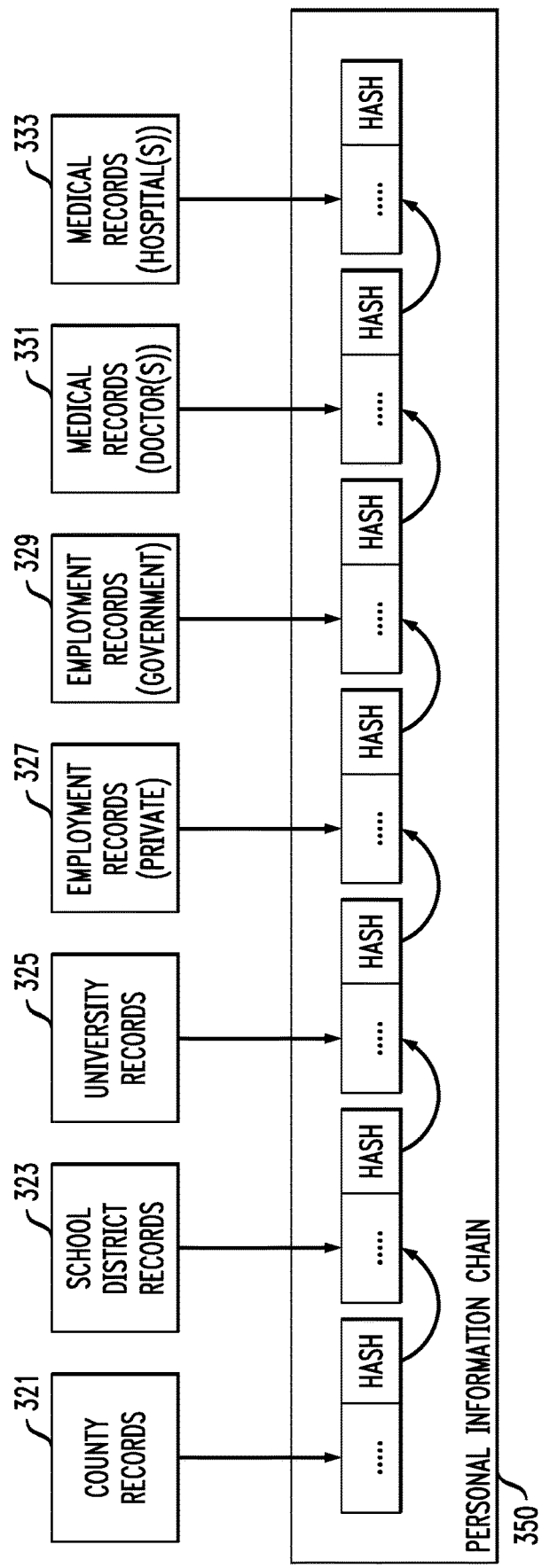
FIG. 3 shows an example personal information chain for a given individual in an illustrative embodiment.

FIG. 3 shows an example personal information chain for a given individual in an illustrative embodiment. By way of illustration, FIG. 3 depicts various records pertaining to the given individual including county records 321 (e.g., birth records, etc.), school district records 323, university records 325, employment records (from private industry and/or employer sources) 327, employment records (from government sources) 329, medical records (from one or more doctor-specific sources) 331, and medical records (from one or more hospital-specific sources) 333. Accordingly, in one or more embodiments, such records can be documented as record entities in object data with corresponding pertinent information about the identity of the stakeholder, date, time, roles, documents exchanged, etc. Each such personal event record can then be added to an individual information list that links all of the other records of the same individual, creating personal information chain 350.

As depicted in FIG. 3, the linking, within personal information chain 350, is achieved by creating a unique message digest and/or hash of the previous life event record and storing the unique message digest and/or hash in the current record. In one or more embodiments, the personal information chain 350 also stores the unique message digest and/or hash of the current record as part of the current record as well. Accordingly, such an embodiment includes ensuring that each life event record is immutable and cannot be subsequently modified via unauthorized means.

FIG. 4 shows an example code snippet for hashing life event records in an illustrative embodiment. In this embodiment, example code snippet 400 is executed by or under the control of at least one processing system and/or device. For example, the example code snippet 400 may be viewed as comprising a portion of a software implementation of at least part of personal information chain generation system 105 of the FIG. 1 embodiment.

The example code snippet 400 illustrates hashing of life event records using a SHA256 algorithm. However, it should be noted that the SHA256 algorithm shown in example code snippet 400 represents merely one example cryptographic algorithm that can be utilized, and one or more embodiments can include using other hashing algorithms such as, for instance, SHA512, RIPEMD, Whirlpool, etc.

It is to be appreciated that this particular example code snippet shows just one example implementation of hashing life event records, and alternative implementations of the process can be used in other embodiments.

FIG. 5 shows an example code snippet for creating a genesis record in an illustrative embodiment. In this embodiment, example code snippet 500 is executed by or under the control of at least one processing system and/or device. For example, the example code snippet 500 may be viewed as comprising a portion of a software implementation of at least part of personal information chain generation system 105 of the FIG. 1 embodiment.

The example code snippet 500 illustrates creation of an individual information list/chain and defining the first record for the individual in the personal information list. In one or more embodiments, the first record is also referred to as the genesis record. By way merely of example, when an individual is born, a birth certificate can be issued (e.g., by the relevant government or hospital entity) and the first record of that individual information list/chain can be created based on the birth certificate.

It is to be appreciated that this particular example code snippet shows just one example implementation of creating a genesis record, and alternative implementations of the process can be used in other embodiments.

FIG. 6 shows an example code snippet for creating a new life event record in an illustrative embodiment. In this embodiment, example code snippet 600 is executed by or under the control of at least one processing system and/or device. For example, the example code snippet 600 may be viewed as comprising a portion of a software implementation of at least part of personal information chain generation system 105 of the FIG. 1 embodiment.

The example code snippet 600 illustrates creation of a new life event record and adding such a record to an individual information list/chain. For example, when a touch-point with a stakeholder (e.g., an entity such as a school, a hospital, a government agency, etc.) occurs, a new life event record is created and added to the individual information list/chain for that individual.

It is to be appreciated that this particular example code snippet shows just one example implementation of creating a new life event record, and alternative implementations of the process can be used in other embodiments.

FIG. 7 shows an example code snippet for retrieving a previous record in an illustrative embodiment. In this embodiment, example code snippet 700 is executed by or under the control of at least one processing system and/or device. For example, the example code snippet 700 may be viewed as comprising a portion of a software implementation of at least part of personal information chain generation system 105 of the FIG. 1 embodiment.

The example code snippet 700 illustrates that at any stage in a given individual's lifecycle, a previous record of the individual information list/chain can be retrieved (along with corresponding details), which helps in tracking the progress and providing a status related to the individual.

It is to be appreciated that this particular example code snippet shows just one example implementation of retrieving a previous record, and alternative implementations of the process can be used in other embodiments.

FIG. 8 shows an example code snippet for performing information verification in an illustrative embodiment. In this embodiment, example code snippet 800 is executed by or under the control of at least one processing system and/or device. For example, the example code snippet 800 may be viewed as comprising a portion of a software implementation of at least part of personal information chain generation system 105 of the FIG. 1 embodiment.

The example code snippet 800 illustrates ensuring accuracy and integrity of the interactions documented on an individual information list/chain. Specifically, to confirm one or more details of generated records, example code snippet 800 includes verifying the identity (e.g., the hash) and the index of a given record, as well as verifying the sequence of the interaction(s) and generating an alert upon identifying and/or determining any missing or incorrect data.

It is to be appreciated that this particular example code snippet shows just one example implementation of performing information verification, and alternative implementations of the process can be used in other embodiments.

Referring again, for example, to FIG. 2, individual information repository 206 can serve as a centralized storage component for at least one individual information list/chain (which, as detailed herein, can be built as a decentralized list of individual touch-point records in a person's lifecycle) and facilitate and/or enhance scalability, performance, and accessibility to the data. To achieve such capabilities, individual information repository 206 can comprise a NoSQL database and/or a graph database, which can be leveraged to manage permissioned personal information of individuals. NoSQL databases are non-relational databases that are suited to manage semi-structured and unstructured data, and graph databases are also non-relational databases which store social and network data in a connected manner. The data (e.g., entities and relationships) are stored as node and edge form, and the attributes are also stored for both nodes and edges. For example, "John Doe owns Laptop 12345" is stored as two nodes, Customer and Asset, with the attributes of name as John Doe. The relationship or the edge that connects the node will have its type as "owns."

As further detailed herein, one or more embodiments can include storing and retrieving information as a graph using a resource description framework (RDF) and/or a labeled property graph (LPG). RDF formats the information (e.g., entity information and relationship information) as a triple (e.g., subject-predicate-object). By way merely of example, information pertaining to the identity of a university that grants a degree to the individual is stored as follows: Subject (University)→Predicate (Grants)→Object (Degree). In at least one embodiment, the subject will represent a resource or node/entity in the graph, the predicate will represent an edge in the graph (e.g., a relationship), and the object will represent another node in the graph. These nodes and edges are identified by a uniform resource identifier (URI), which represents a unique identifier. Also, in one or more embodiments, the nodes and edges do not have any internal structure; the URI labels them. This type of model is efficient, for example, for data exchange.

In an LPG type of graph, each entity is represented as a node with a uniquely identifiable identifier (ID) and a set of key-value pairs and/or properties that characterize the pairs. In one or more embodiments, the relationship between two entities is described as an edge or connection between the nodes. Relationships have an ID to identify the relationships (e.g., "graduated" in the context of a university degree, "undergone surgery" in the context of a hospitalization record, etc.) as well as the corresponding relationship type. In at least one embodiment, relationships also have a set of key-value pairs as properties that characterize the connections. This type of structure provides a robust internal design for the entities and relationships, and also facilitates and/or enhances the storage and querying of information.

One or more embodiments include maintaining information pertaining to all interactions and contents of an individual information repository in an LPG format because of the efficiency and performance of storing and querying information in a property graph format (e.g., via ArangoDB, Apache TinkerPop, Titan, Neo4J, etc.). Such graph stores are utilized as the platform for an individual's personal information repository to store, manage, and query data relationships. In at least one embodiment, a graph database enables the repository (e.g., individual information repository 206) to traverse and analyze any level of depth (e.g., in real-time), as well as to add context and connect new data on the fly. Such capabilities can provide a foundation for maintaining end-to-end lifecycle information for individual life events in a single place for future interactions, which enables an efficient mechanism to search the information captured in the graph in a meaningful manner.

Additionally, as detailed herein and in connection with one or more embodiments, NoSQL databases provide a multitude of query languages (e.g., Gremlin, Cypher, SPARQL, Graphene, etc.) to retrieve entities and/or concepts, as well as relationships.

Referring again to FIG. 2, machine learning-based anomaly detection engine 214 performs multiple functions. For example, by leveraging the hash of an individual entry of life event touch-point data and linking each record with the hash of the previous record, an individual information list/chain already introduces a level of security related, for example, to identity and data integrity. Additionally, data security can be enhanced by implementing anomaly and/or fraud detection capability in the individual's personal life event chain data. Using machine learning-based anomaly detection engine 214, anomalies related to stakeholder behavior in the lifecycle data can be detected and alerted (e.g., for potential fraud-related remedial actions). For example, consider a scenario wherein a higher education institute that typically grants degrees suddenly creates a medical record. Such an instance can be processed via machine learning-based anomaly detection engine 214 and determined to be an anomaly and/or potential instance of fraud, and a corresponding alert can be generated for remedial (e.g., immediate and/or automated) action.

Anomaly detection includes a mechanism for identifying situations and/or data instances that are not considered normal based on the observation of one or more properties being considered. Individual information list/chain anomaly detection can be achieved by leveraging anomaly detection mechanisms via machine learning techniques embodied within a detection engine (e.g., machine learning-based anomaly detection engine 214). For example, in at least one embodiment, a machine learning-based anomaly detection algorithm learns from historical data pertaining to one or more interactions and data exchanges from stakeholders in the given lifecycle, and by measuring and/or analyzing the behaviors and corresponding relationships thereof, the anomaly detection engine can predict when the state is normal and when the state is anomalous.

By way merely of example, one or more embodiments can include using machine learning algorithms such as at least one unsupervised decision tree-based shallow learning algorithm (e.g., an isolation forest model), at least one deep learning algorithm, etc. For instance, an example embodiment can include implementing multi-variate anomaly detection using an isolation forest model. In such an embodiment, the isolation forest model has the capacity to scale-up to handle extremely large data sizes and high-dimensional problems with a large number of attributes, some of which may be irrelevant and potential noise. The isolation forest model also has a low linear time complexity and is efficient in dealing with masking and swamping effects in anomaly detection. More specifically, implementing an isolation forest model includes isolating an anomaly by creating decision trees over random attributes. This random partitioning can produce significantly shorter paths (than other algorithms) because fewer instances of anomalies result in smaller partitions, and distinguishable attribute values are more likely to be separated in early partitioning. Accordingly, when a forest (i.e., group) of random trees collectively produces shorter path lengths for some particular points, then such points are highly likely to be anomalies.

In one or more embodiments, a given number of splits are required to isolate a normal point while an anomaly can be isolated by a shorter number of splits. The number of splits determine the level at which the isolation occurs, and can be used to generate a corresponding anomaly score. One or more embodiments include using an isolation forest model, which uses a splitting model for isolating and/or detecting anomalous data. The scores are generated by the algorithm based on how many splits are needed to isolate. The fewer the number of splits to isolate indicates anomalous data, and more splits indicates normal data. Such a process can be repeated multiple times, with the isolation level of each point being noted. Once an iteration is over, the anomaly score of each point/instance suggests the likelihood of an anomaly. In at least one embodiment, the anomaly score is a function of the average level at which the point is isolated, and the top points/instances gathered on the basis of the score are labeled as anomalies.

FIG. 9 shows an example code snippet for determining an anomaly score in an illustrative embodiment. In this embodiment, example code snippet 900 is executed by or under the control of at least one processing system and/or device. For example, the example code snippet 900 may be viewed as comprising a portion of a software implementation of at least part of personal information chain generation system 105 of the FIG. 1 embodiment.

The example code snippet 900 illustrates parameters (e.g., personal information role, type information, etc.) are periodically collected from stakeholders and input to an anomaly detection engine for processing and/or prediction. An isolation forest model, already trained using historical pattern data, processes this input to generate a prediction, and if the model identifies a given parameter value as deviating from typical values, the model predicts and identifies the state as an anomaly. As depicted in FIG. 9, example code snippet 900 is implemented using a ScikitLearn library, Pandas, Numpy and Python with a Jupyter notebook.

It is to be appreciated that this particular example code snippet shows just one example implementation of determining an anomaly score, and alternative implementations of the process can be used in other embodiments.

Figure 10:
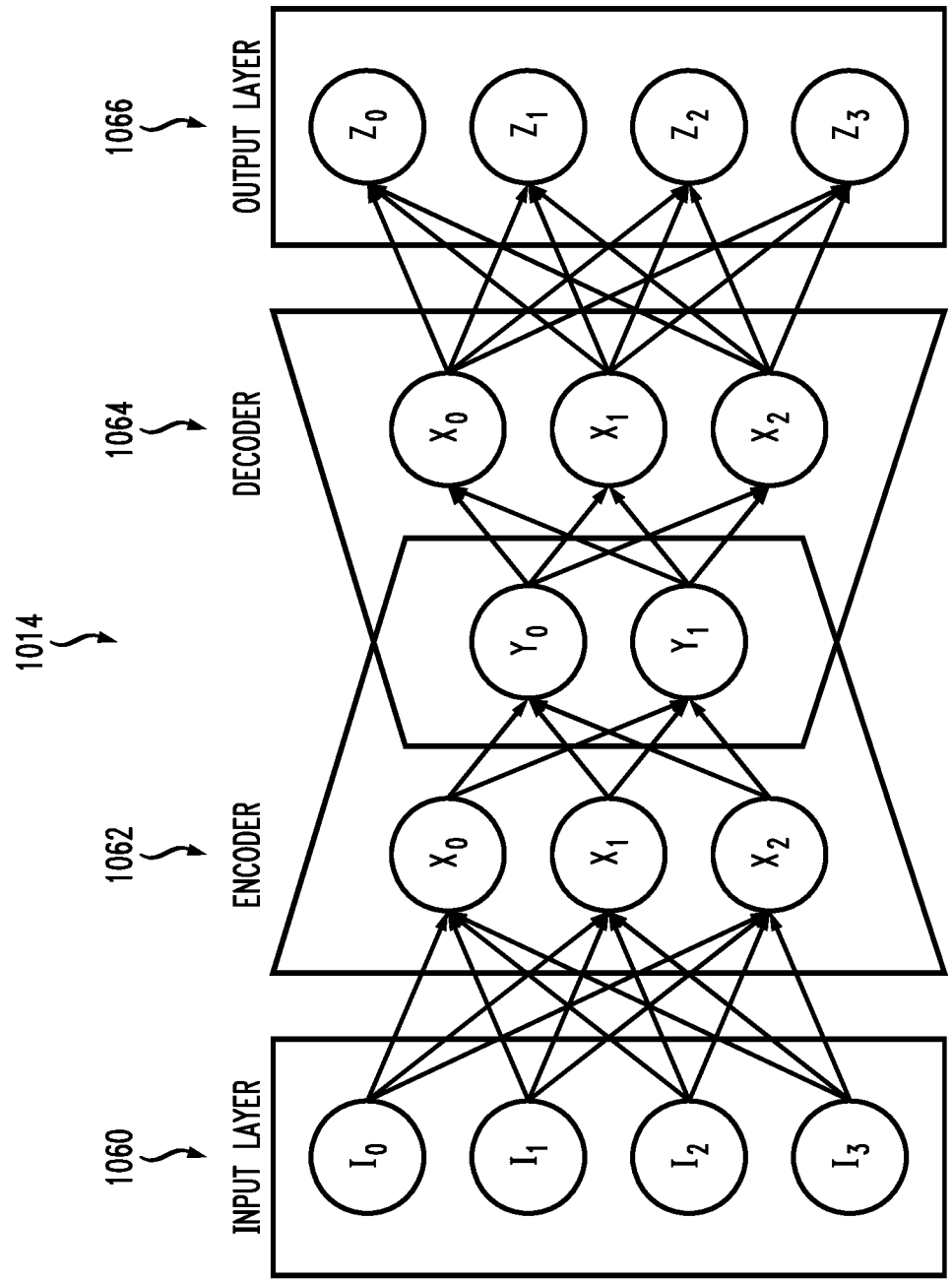
FIG. 10 shows an example autoencoder network used in connection with multi-variate anomaly detection in an illustrative embodiment.

FIG. 10 shows an example autoencoder network used in connection with multi-variate anomaly detection in an illustrative embodiment. Specifically, FIG. 10 depicts an autoencoder network 1014 to learn efficient data coding and/or feature learning in an unsupervised manner. The goal of autoencoder network 1014 is to learn at least one representation and/or feature (e.g., an encoding) for a set of data, for example, for dimensionality reduction. Along with such reduction, at least one embodiment can include implementing reconstruction, wherein relevant information is learned such that the autoencoder network 1014 attempts to generate, from the reduced encoding, a representation as close as possible to the original input. By way of example, the autoencoder network 1014 can utilize input data parameters such as, for instance, identity of stakeholder, role, interaction data, etc., and by performing encoding and decoding, can learn the correlation between at least a portion of the input data parameters.

Architecturally, as depicted in FIG. 10, autoencoder network 1014 represents a form of a feed-forward neural network such as an artificial neural network (ANN) and/or a multi-layer perceptron (MLP). Specifically, autoencoder network 1014 includes input layer 1060, output layer 1066, and hidden layers in between, such as encoder layer 1062 and decoder layer 1064. In one or more embodiments, output layer 1066 has the same number of nodes as input layer 1060. In the example autoencoder architecture depicted in FIG. 10, $I_0$, $I_1$, $I_2$ and $I_3$ represent the neurons representing input variables, $X_0$, $X_1$ and $X_2$ in encoder layer 1062 represent the neurons for encoding the features from the input variables, $Y_0$ and $Y_1$ represent the neurons with compressed features from encoder layer 1062, and $X_0$, $X_1$ and $X_2$ in decoder layer 1064 represent the neurons which are the same as those in the encoder layer 1062. Also, $Z_0$, $Z_1$, $Z_2$ and $Z_3$ represent output neurons which are the same in number as the input variables. As detailed herein, an autoencoder takes a number of input variables, compresses the input variables, then decompresses the variables and compares them to determine if the output is back to the same exact form.

In at least one embodiment, and within the context of anomaly detection, autoencoder network 1014 compress data (e.g., an individual's personal information) to a lower dimensional representation, which will result in capturing correlations and interactions between various variables and/or parameters. The autoencoder network 1014 is then trained using data from normal operating states of the stakeholders (e.g., institutions, organizations, enterprises, etc.), subsequently compressing and then reconstructing at least a portion of the input variables.

During the dimensionality reduction, the autoencoder network 1014 learns one or more interactions between various variables and reconstructs data back to the original variables at the output. If a fraud scenario is identified and/or appears in connection with one of the stakeholders, such fraud would likely affect the interaction between at least a portion of the variables. In such a scenario, the number of errors tends to increase in the reconstruction of the networks input variables. By utilizing a probability distribution of the reconstruction error, the autoencoder network 1014 identifies whether a sample data point (e.g., a touch-point with a stakeholder) is normal or anomalous. Based on the decision from autoencoder network 1014, anomalous behaviors can be identified and alerted to initiate one or more corrective actions.

By way merely of example, at least one embodiment can be implemented as a deep learning algorithm (e.g., ANN, long short-term memory (LSTM), one or more transformers, and/or other neural network-based algorithms) on Python with Keras and TensorFlow backend. For instance, such an embodiment can include a three-layer network implemented using Keras and/or TensorFlow libraries, with approximately 10-12 nodes in the input and output layers. Additionally, in such an embodiment, a mean squared error can be used as a loss function and Adam, an adaptive optimized algorithm, can be used for stochastic optimization. It should be noted, however, that such algorithms are identified merely as examples, and one or more embodiments can include using and/or modifying one or more algorithms as part of hyper-parameter search and tuning activities to reach enhanced model performance and accuracy.

It is to be appreciated that a "model," as used herein, refers to an electronic digitally stored set of executable instructions and data values, associated with one another, which are capable of receiving and responding to a programmatic or other digital call, invocation, and/or request for resolution based upon specified input values, to yield one or more output values that can serve as the basis of computer-implemented recommendations, output data displays, machine control, etc. Persons of skill in the field may find it convenient to express models using mathematical equations, but that form of expression does not confine the model(s) disclosed herein to abstract concepts; instead, each model herein has a practical application in a processing device in the form of stored executable instructions and data that implement the model using the processing device.

Figure 11:
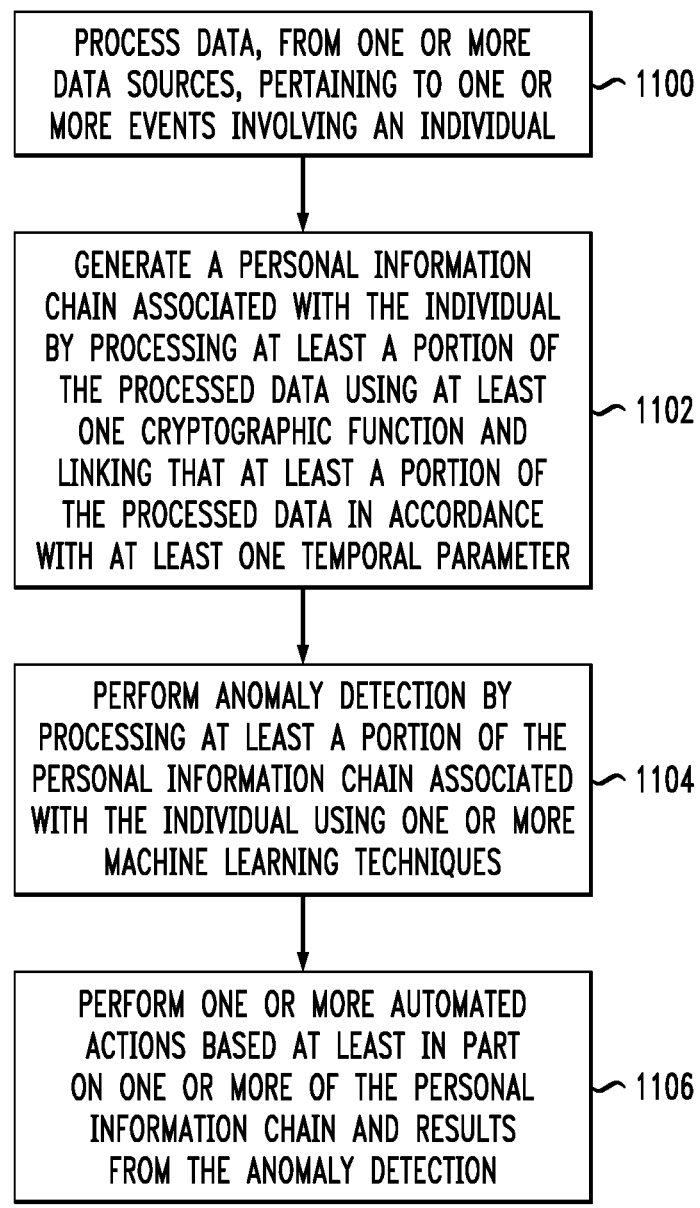
FIG. 11 is a flow diagram of a process for generating and processing personal information chains using machine learning techniques in an illustrative embodiment.

FIG. 11 is a flow diagram of a process for generating and processing personal information chains using machine learning techniques in an illustrative embodiment. It is to be understood that this particular process is only an example, and additional or alternative processes can be carried out in other embodiments.

In this embodiment, the process includes steps 1100 through 1106. These steps are assumed to be performed by personal information chain generation system 105 utilizing elements 112, 114 and 116.

Step 1100 includes processing data, from one or more data sources, pertaining to one or more events involving an individual. In at least one embodiment, processing data includes documenting the data as record entities in object data with corresponding information pertaining to one or more of participant identification, date, time, and one or more documents exchanged. Additionally or alternatively, processing data can include implementing multi-party authentication, in connection with (i) at least one entity associated with at least one of the one or more data sources and (ii) the individual, with respect to the data.

Step 1102 includes generating a personal information chain associated with the individual by processing at least a portion of the processed data using at least one cryptographic function and linking that at least a portion of the processed data in accordance with at least one temporal parameter. In one or more embodiments, generating a personal information chain includes, for each of multiple records within the processed data, creating one of a unique message digest and a hash of a temporally preceding record and storing the unique message digest or hash in conjunction with the temporally subsequent record. Such an embodiment can also include creating one of a unique message digest and a hash of the temporally subsequent record and storing the unique message digest or hash of the temporally subsequent record with the unique message digest or hash of the temporally preceding record.

Step 1104 includes performing anomaly detection by processing at least a portion of the personal information chain associated with the individual using one or more machine learning techniques. In at least one embodiment, processing at least a portion of the personal information chain associated with the individual using one or more machine learning techniques includes processing at least a portion of the personal information chain associated with the individual using at least one unsupervised decision tree-based shallow learning algorithm, at least one deep learning algorithm, and/or at least one neural network-based autoencoder. Additionally or alternatively, processing at least a portion of the processed data using at least one cryptographic function can include processing at least a portion of the processed data using at least one hashing algorithm and/or at least one message digest algorithm.

Step 1106 includes performing one or more automated actions based at least in part on one or more of the personal information chain and results from the anomaly detection. In one or more embodiments, performing one or more automated actions includes storing the personal information chain in at least one graph database. In such an embodiment, storing the personal information chain in at least one graph database can include implementing permissioned application programming interface-based access to the stored personal information chain in connection with at least one application programming interface query language. Additionally or alternatively, storing the personal information chain in at least one graph database can include storing the personal information chain using at least one of a resource description framework and a labeled property graph. In at least one embodiment, performing one or more automated actions can also include automatically training the one or more machine learning techniques using at least a portion of the results from the anomaly detection.

Accordingly, the particular processing operations and other functionality described in conjunction with the flow diagram of FIG. 11 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to generate and process personal information chains using machine learning techniques. These and other embodiments can effectively overcome problems associated with data security, data accuracy, and data visibility.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 12 and 13. Although described in the context of system 100, these platforms may also be used to implement at least portions of other information processing systems in other embodiments.

Figure 12:
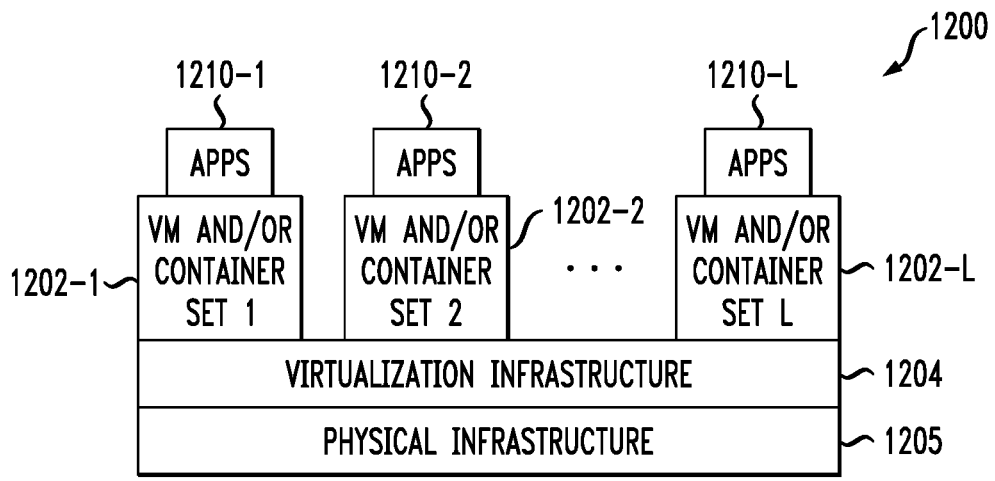
FIGS. 12 and 13 show examples of processing platforms that may be utilized to implement at least a portion of an information processing system in illustrative embodiments.
Figure 13:
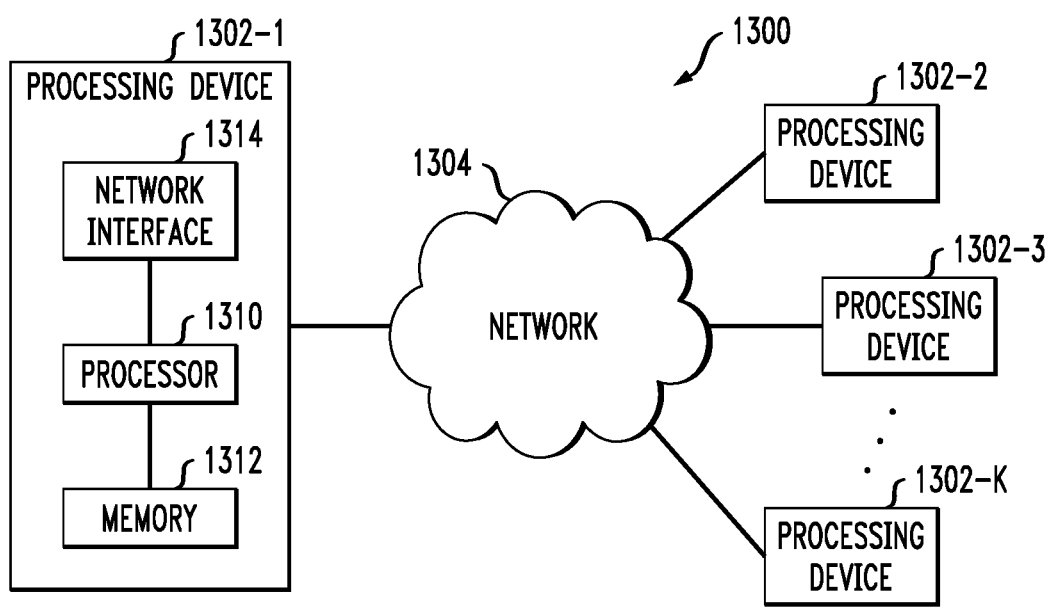

FIG. 12 shows an example processing platform comprising cloud infrastructure 1200. The cloud infrastructure 1200 comprises a combination of physical and virtual processing resources that are utilized to implement at least a portion of the information processing system 100. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 comprise respective VMs, respective sets of one or more containers, or respective sets of one or more containers running in VMs. In some implementations of the FIG. 12 embodiment, the VMs/container sets 1202 comprise respective VMs implemented using virtualization infrastructure 1204 that comprises at least one hypervisor.

A hypervisor platform may be used to implement a hypervisor within the virtualization infrastructure 1204, wherein the hypervisor platform has an associated virtual infrastructure management system. The underlying physical machines comprise one or more information processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-K, which communicate with one another over a network 1304.

The network 1304 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1302-1 in the processing platform 1300 comprises a processor 1310 coupled to a memory 1312.

The processor 1310 comprises a microprocessor, a CPU, a GPU, a TPU, a microcontroller, an ASIC, a FPGA or other type of processing circuitry, as well as portions or combinations of such circuitry elements.

The memory 1312 comprises random access memory (RAM), read-only memory (ROM) or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
processing data, from one or more data sources, pertaining to one or more events involving an individual;
generating a personal information chain associated with the individual by processing at least a portion of the processed data using at least one cryptographic function and linking that at least a portion of the processed data in accordance with at least one temporal parameter, wherein generating a personal information chain comprises, for each of multiple records within the at least a portion of the processed data, creating, using at least one message digest algorithm, a unique message digest of a temporally preceding record and storing the unique message digest in conjunction with at least one temporally subsequent record;
performing anomaly detection by:
processing at least a portion of the personal information chain associated with the individual using one or more machine learning techniques in conjunction with implementing one or more random partitioning techniques across the at least a portion of the personal information chain, the one or more random partitioning techniques being configured to create multiple decision trees over multiple randomly selected data attributes within the at least a portion of the personal information chain; and
generating anomaly scores for at least a portion of the multiple randomly selected data attributes based at least in part on a number of partitions associated with the one or more of the multiple decision trees corresponding thereto, wherein generating anomaly scores comprises determining, for multiple iterations of the creating of the multiple decision trees, a number of partitions associated with one or more of the multiple decision trees for at least a subset of the multiple iterations, and calculating the anomaly scores based at least in part on the determined number of partitions; and
performing one or more automated actions based at least in part on one or more of the personal information chain and results from the anomaly detection, wherein performing one or more automated actions comprises:
populating at least one graph data structure with at least portions of the personal information chain;
storing the at least one graph data structure in at least one graph database; and
implementing permissioned application programming interface-based access to the at least one graph database in connection with one or more designated application programming interface query languages;
wherein the method is performed by at least one processing device comprising a processor coupled to a memory.

2. The computer-implemented method of claim 1, wherein storing the personal information chain in at least one graph database comprises storing the personal information chain using at least one of a resource description framework and a labeled property graph.

3. The computer-implemented method of claim 1, wherein processing at least a portion of the personal information chain associated with the individual using one or more machine learning techniques comprises processing at least a portion of the personal information chain associated with the individual using at least one unsupervised decision tree-based shallow learning algorithm.

4. The computer-implemented method of claim 1, wherein processing at least a portion of the personal information chain associated with the individual using one or more machine learning techniques comprises processing at least a portion of the personal information chain associated with the individual using at least one deep learning algorithm.

5. The computer-implemented method of claim 1, wherein processing at least a portion of the personal information chain associated with the individual using one or more machine learning techniques comprises processing at least a portion of the personal information chain associated with the individual using at least one neural network-based auto-encoder.

6. The computer-implemented method of claim 1, wherein processing at least a portion of the processed data using at least one cryptographic function comprises processing at least a portion of the processed data using at least one hashing algorithm.

7. The computer-implemented method of claim 1, further comprising:
creating a unique message digest the at least one temporally subsequent record and storing the unique message digest of the at least one temporally subsequent record with the unique message digest of the temporally preceding record.

8. The computer-implemented method of claim 1, wherein performing one or more automated actions comprises automatically training the one or more machine learning techniques using at least a portion of the results from the anomaly detection.

9. The computer-implemented method of claim 1, wherein processing data comprises documenting the data as record entities in object data with corresponding information pertaining to one or more of participant identification, date, time, and one or more documents exchanged.

10. The computer-implemented method of claim 1, wherein processing data comprises implementing multi-party authentication, in connection with (i) at least one entity associated with at least one of the one or more data sources and (ii) the individual, with respect to the data.

11. A non-transitory processor-readable storage medium having stored therein program code of one or more software programs, wherein the program code when executed by at least one processing device causes the at least one processing device:
to process data, from one or more data sources, pertaining to one or more events involving an individual;
to generate a personal information chain associated with the individual by processing at least a portion of the processed data using at least one cryptographic function and linking that at least a portion of the processed data in accordance with at least one temporal parameter, wherein generating a personal information chain comprises, for each of multiple records within the at least a portion of the processed data, creating, using at least one message digest algorithm, a unique message digest of a temporally preceding record and storing the unique message digest in conjunction with at least one temporally subsequent record;

to perform anomaly detection by:
processing at least a portion of the personal information chain associated with the individual using one or more machine learning techniques in conjunction with implementing one or more random partitioning techniques across the at least a portion of the personal information chain, the one or more random partitioning techniques being configured to create multiple decision trees over multiple randomly selected data attributes within the at least a portion of the personal information chain; and generating anomaly scores for at least a portion of the multiple randomly selected data attributes based at least in part on a number of partitions associated with the one or more of the multiple decision trees corresponding thereto, wherein generating anomaly scores comprises determining, for multiple iterations of the creating of the multiple decision trees, a number of partitions associated with one or more of the multiple decision trees for at least a subset of the multiple iterations, and calculating the anomaly scores based at least in part on the determined number of partitions; and to perform one or more automated actions based at least in part on one or more of the personal information chain and results from the anomaly detection, wherein performing one or more automated actions comprises:
populating at least one graph data structure with at least portions of the personal information chain;
storing the at least one graph data structure in at least one graph database; and
implementing permissioned application programming interface-based access to the at least one graph database in connection with one or more designated application programming interface query languages.

12. The non-transitory processor-readable storage medium of claim 11, wherein storing the personal information chain in at least one graph database comprises storing the personal information chain using at least one of a resource description framework and a labeled property graph.

13. The non-transitory processor-readable storage medium of claim 11, wherein processing at least a portion of the personal information chain associated with the individual using one or more machine learning techniques comprises processing at least a portion of the personal information chain associated with the individual using at least one unsupervised decision tree-based shallow learning algorithm.

14. The non-transitory processor-readable storage medium of claim 11, wherein processing at least a portion of the personal information chain associated with the individual using one or more machine learning techniques comprises processing at least a portion of the personal information chain associated with the individual using at least one deep learning algorithm.

15. The non-transitory processor-readable storage medium of claim 11, wherein processing at least a portion of the personal information chain associated with the individual using one or more machine learning techniques comprises processing at least a portion of the personal information chain associated with the individual using at least one neural network-based auto-encoder.

16. An apparatus comprising:
at least one processing device comprising a processor coupled to a memory;
the at least one processing device being configured:
to process data, from one or more data sources, pertaining to one or more events involving an individual;
to generate a personal information chain associated with the individual by processing at least a portion of the processed data using at least one cryptographic function and linking that at least a portion of the processed data in accordance with at least one temporal parameter, wherein generating a personal information chain comprises, for each of multiple records within the at least a portion of the processed data, creating, using at least one message digest algorithm, a unique message digest of a temporally preceding record and storing the unique message digest in conjunction with at least one temporally subsequent record;
to perform anomaly detection by:
processing at least a portion of the personal information chain associated with the individual using one or more machine learning techniques in conjunction with implementing one or more random partitioning techniques across the at least a portion of the personal information chain, the one or more random partitioning techniques being configured to create multiple decision trees over multiple randomly selected data attributes within the at least a portion of the personal information chain; and
generating anomaly scores for at least a portion of the multiple randomly selected data attributes based at least in part on a number of partitions associated with the one or more of the multiple decision trees corresponding thereto, wherein generating anomaly scores comprises determining, for multiple iterations of the creating of the multiple decision trees, a number of partitions associated with one or more of the multiple decision trees for at least a subset of the multiple iterations, and calculating the anomaly scores based at least in part on the determined number of partitions; and
to perform one or more automated actions based at least in part on one or more of the personal information chain and results from the anomaly detection, wherein performing one or more automated actions comprises:
populating at least one graph data structure with at least portions of the personal information chain;
storing the at least one graph data structure in at least one graph database; and
implementing permissioned application programming interface-based access to the at least one graph database in connection with one or more designated application programming interface query languages.

17. The apparatus of claim 16, wherein storing the personal information chain in at least one graph database comprises storing the personal information chain using at least one of a resource description framework and a labeled property graph.

18. The apparatus of claim 16, wherein processing at least a portion of the personal information chain associated with the individual using one or more machine learning techniques comprises processing at least a portion of the personal information chain associated with the individual using at least one unsupervised decision tree-based shallow learning algorithm.

19. The apparatus of claim 16, wherein processing at least a portion of the personal information chain associated with the individual using one or more machine learning techniques comprises processing at least a portion of the personal information chain associated with the individual using at least one deep learning algorithm.

20. The apparatus of claim 16, wherein processing at least a portion of the personal information chain associated with the individual using one or more machine learning techniques comprises processing at least a portion of the personal information chain associated with the individual using at least one neural network-based auto-encoder.

* * * * *